United States Patent [19]

Braun et al.

[11] Patent Number: 4,541,525

[45] Date of Patent: Sep. 17, 1985

[54] CONVEYOR TROUGH, PARTICULARLY FOR SCRAPER CHAIN CONVEYORS

[75] Inventors: Ernst Braun; Gert Braun, both of Essen-Heisingen, Fed. Rep. of Germany

[73] Assignee: Halbach & Braun, Fed. Rep. of Germany

[21] Appl. No.: 445,432

[22] Filed: Nov. 30, 1982

[30] Foreign Application Priority Data

Dec. 19, 1981 [DE] Fed. Rep. of Germany ....... 3150459

[51] Int. Cl.$^4$ ............................................. B65G 19/28
[52] U.S. Cl. .................................. 198/735; 198/861.4
[58] Field of Search ............... 198/583, 584, 735, 860, 198/861, 864; 403/364

[56] References Cited

U.S. PATENT DOCUMENTS

| 757,812 | 4/1904 | Keyes | 403/364 |
| 4,015,706 | 4/1977 | Goffredo et al. | 198/861 |

FOREIGN PATENT DOCUMENTS 462099  3/1937  United Kingdom ................ 198/735

Primary Examiner—Joseph E. Valenza
Attorney, Agent, or Firm—McGlew and Tuttle

[57] ABSTRACT

A conveyor trough particularly for scraper chain conveyors comprises a plurality of transversely extending interconnected plates with adjacent plates having abutting edges with alternately arranged projecting tongues and recesses which define a hinge connection between the longitudinally adjacent plates. The plates are advantageously substantially flat and include tongue formations formed by recesses made either on the top or the bottom of the plate for selectively defining underlying or overlying tongues.

4 Claims, 5 Drawing Figures

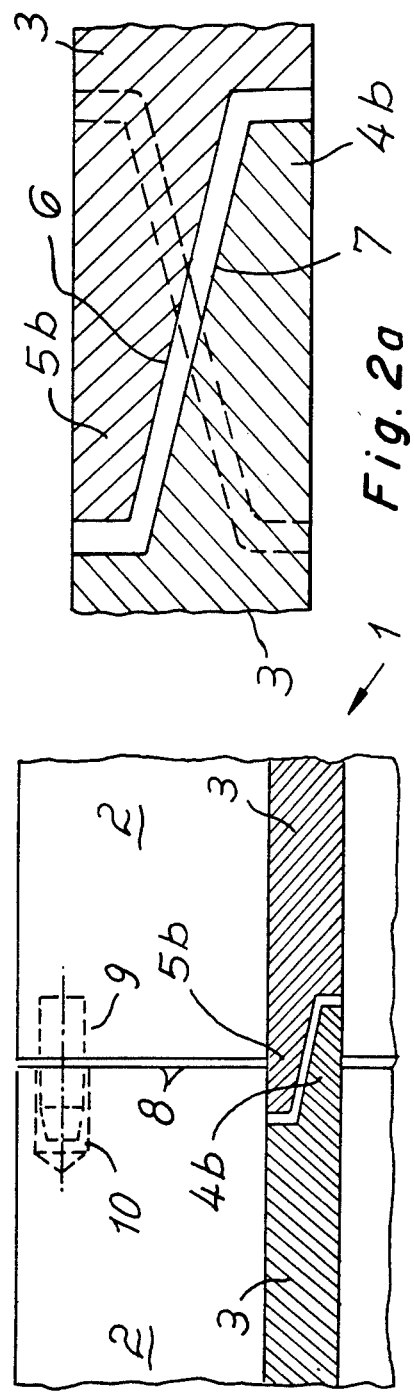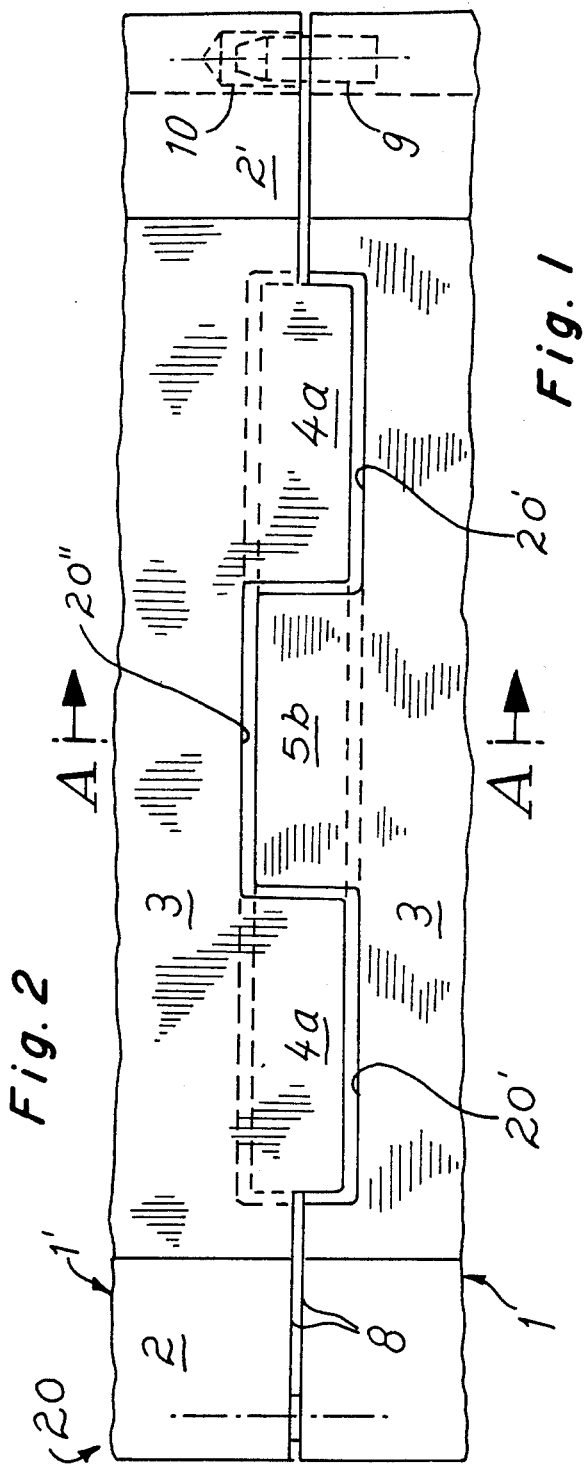

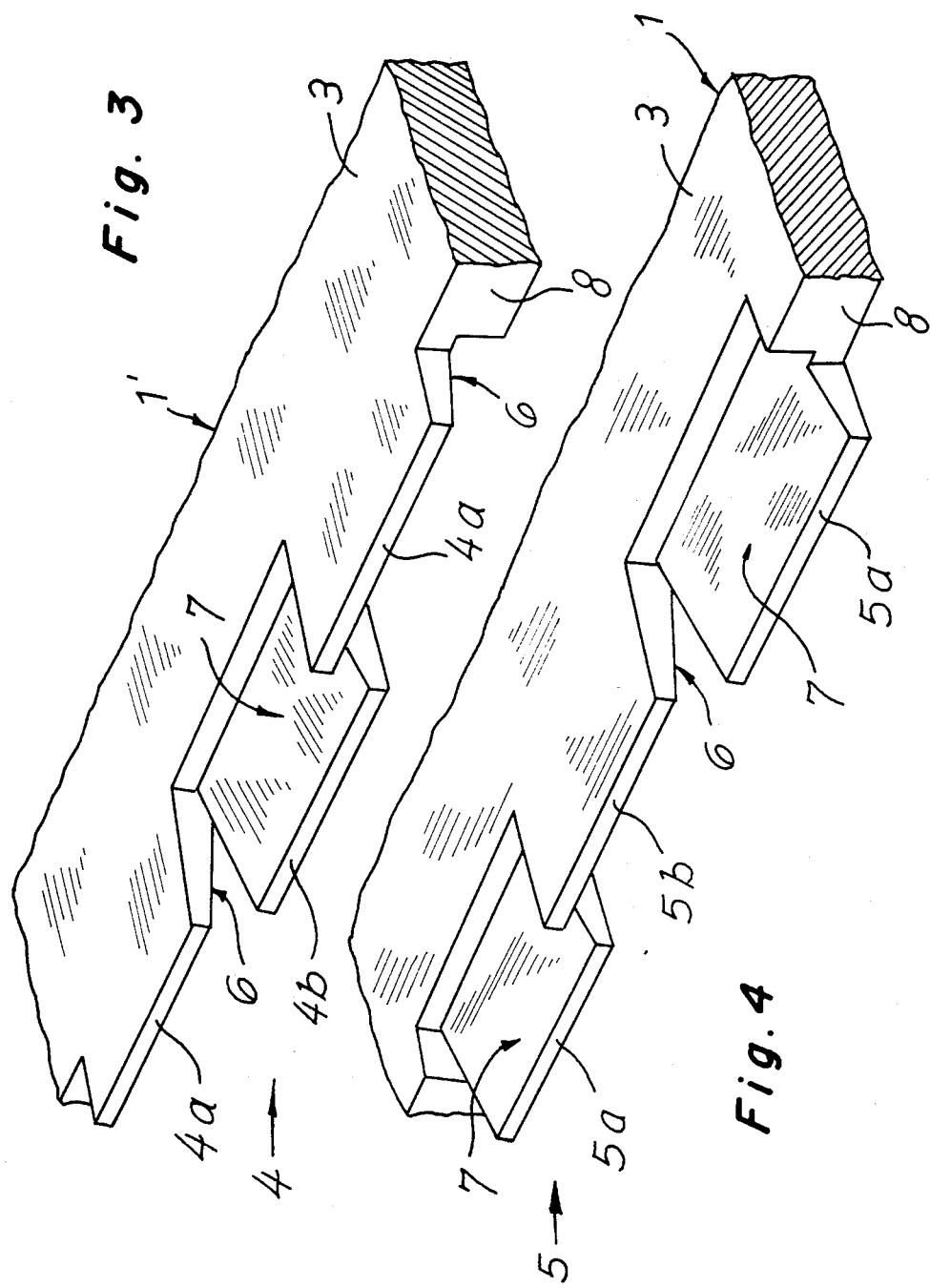

CONVEYOR TROUGH, PARTICULARLY FOR SCRAPER CHAIN CONVEYORS

FIELD AND BACKGROUND OF THE INVENTION

The invention relates in general to conveyors and in particular to a new and useful conveyor trough, particularly for scraper chain conveyors, comprising trough lengths which are provided with connecting elements in the abutting zones of their side walls, and with overlapping bottom plates.

There are known conveyor troughs in which the bottom plates of consecutive trough lengths butt against each other without any overlap. Other known designs provide overlapping of the bottom plates along the entire width of the trough. A simple overlap, however, is generally not capable of taking up the stresses occurring in the butt joint and transferring them to the conveyor strand. To this end, connecting elements are rather provided which are usually designed as lugs, bolts or screws. Frequently, the side walls of the trough are even equipped with brackets by which the stresses occurring in the butt joints are absorbed, since conventional lug or screw connections alone often are unsuitable for this purpose. This also applies to connections for troughs requiring double bottom plates, with a connecting plate at the end of one of the trough lengths to be assembled, which connecting plate projects beyond the end edge and is pivotable lengthwise and sidewise and is provided with connecting extensions in the shape of eyes or lugs permitting connecting the plate to the supporting structure of the next trough length. These connecting elements are fitted from the outside into the recessed portions of the side walls of the trough and have aligned bores for connecting screws (see German AS 1024880).

SUMMARY OF THE INVENTION

The invention is directed to a conveyor trough, particularly for scraper chain conveyors in which the bottom plates in the joints of the trough lengths are centered in a manner permitting dissipation of the stresses into the conveyor strand and thus reduce the peak loads.

This problem is solved by providing that in the overlap zone, the bottom plates of consecutive trough lengths are designed with coupling tongues having the configuration of hinge straps fingering into one another, and that over the entire width of the trough, the coupling tongues overlap each other alternately.

The invention starts from the experience that a centering effect is produced by the coupling tongues alternately engaging over and between one another, because the respective adjoining trough lengths cannot give way neither upwardly nor sidewards, under the stresses occurring in the abutment zone, while the freedom of motion necessary for the horizontal and vertical angling still remains preserved. The centering effect further results in a propagation of the stresses occurring in the joint, into the conveyor strand. Actually, the occurring bending, torsional and shearing forces are taken up by the side walls and transmitted to the conveyor strand. Since in accordance with the teaching ot the invention, alternately overlapping tongues are provided, not only a centering effect but also a resetting effect is obtained, i.e. the bottom plates are prevented to the largest extent from spreading apart more and more. Unlike with the prior art simple overlapping, the inventive interengaging and alternately overlapping coupling tongues can neither migrate or deflect upwardly nor downwardly, and the bottom plates remain substantially in the same plane. This eliminates the premature wear of the bottom plates in the zone of overlapping and, consequently, an increase in deformation.

There are further features which are advantageous to the invention. For example, in accordance with the preferred embodiment, it is provided that each bottom plate has one abutting end designed with an upper coupling tongue on either side and a lower coupling tongue therebetween, and the other abutting end designed with a lower coupling tongue on either side and an upper coupling tongue therebetween and that with the bottom plate in abutting position, each central upper coupling tongue engages with a predetermined play between the two upper coupling tongues of the adjoining trough length, while the two lower coupling tongues received between them with a predetermined play the central lower coupling tongue of the adjoining trough length.

The two external upper and lower coupling tongues thus flank the central upper and lower coupling tongues engaged therebetween, so that not only a mutual vertical support, but also a mutual horizontal bracing is obtained. In addition, the trough lengths can be turned upside down, which means that if the upper side, for example, is worn down, the underside can upon a simple inversion perform the function of the upper side. In accordance with the invention, the upper coupling tongues have a tapering underside and the lower coupling tongues have a tapering upper surface, with the two tapers corresponding to each other and both the upper and lower surfaces of the tongues being flush with the respective surfaces of the bottom plates. The side walls extend by their butt faces up to the center of the respective overlap zones, and the tongues have mutually identical cross sections. This optimizes the capability of the trough lengths of being used in inverted positions.

In contradistinction to the conventional arrangement of connecting elements, the invention recommends that the abutting faces of the side walls of the trough with connecting bolts on one side, and with corresponding recesses, such as blind bores, for the bolts, on the other side. Up to the present time, the connecting elements were always provided outside the side walls. The inventive design, however, makes it possible to provide connecting bolts in upper and lower corner portions of the side walls of the trough since the coupling tongues which interengage in the manner of hinge straps and overlap alternately are highly loadable and reduce the otherwise occurring peak loads to fractional values. At the same time, the connecting bolts perform a centering function and thus assist the coupling tongues.

The invention provides the substantial advantages that centering and resetting effects are obtained in the abutment zones of the individual trough lengths, by which the peak loads are reduced and the usual bending, torsional and shearing forces are transferred into a trough strand, so that deformations spreading apart and premature wear in the overlap zone are eliminated. In addition, a completely satisfactory alignment of the trough lengths and thus also of the side walls or the fillets thereof in the direction of the trough strand are ensured. The result is an easily moving conveyor trough section of invertible lengths.

Accordingly, it is an object of the invention to provide a conveyor trough particularly for scraper chain conveyors which comprises a plurality of transversely extending interconnected plates with adjacent plates having abutting edges with alternately arranged projecting tongues and recesses defining a hinge connection between longitudinally adjacent plates.

A further object of the invention is to provide a conveyor trough construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated. As shown in FIGS. 3 and 4, each tapered surface 6 and 7 extends from an inner vertical face which is perpendicular to the top and bottom faces of the plate, to an outer vertical face which is also perpendicular to the top and bottom faces of the plate. As shown in FIG. 2A, the gap between the vertical faces and tapered surfaces of adjacent plates are selected so that the vertical faces of the adjacent plates may abut each other before the tapered surfaces 6 and 7 come into contact with each other.

BRIEF DESCRIPTION OF THE DRAWINGS

In the drawings

FIG. 1 is a partial top plan view of a scraper chain conveyor trough constructed in accordance with the invention;

FIG. 2 is a section taken along the lines A—A of FIG. 1;

FIG. 2a is an enlarged partial sectional view of the plates shown in FIG. 2.

FIG. 3 is a front top perspective view of one end of a bottom plate; and

FIG. 4 is a view similar to FIG. 3 of the other end of the plate.

DESCRIPTION OF THE PREFERRED EMBODIMENTS

Referring to the drawings in particular the invention embodied therein comprises a conveyor trough generally designated 20 particularly for scraper chain conveyors which comprises a plurality of transversely extending interconnected plates 1,1' etc. Adjacent plates 1 and 1' have abutting edges 8, with alternately arranged projecting tongues, 4a, 4a in respect to plate indicated 1' in FIG. 1 and 5b in respect to plate 1 and recesses 20, 20 in respect to plate 1 and 20' in respect to plate 1'. The projecting tongues of the two plates are shown to have both a vertical and a horizontal clearance therebetween for permitting slight vertical and slight horizontal angling between the two plates.

As shown in FIG. 3 each plate 1 or 1' has one abutting edge with an underlying coupling tongue 4b positioned between two overlying projecting tongues 4a, 4a as shown in FIG. 3. An opposite edge has two underlying tongues 5a, 5a which project outwardly from this edge on each side of an overlying tongue 5b.

The figures show a conveyor trough, particularly for scraper chain conveyors, substantially comprising trough lengths 1 with connecting elements provided in the abutment areas of side walls 2,2' of the trough, and overlapping bottom plates 3. In the overlap zone, the bottom plates of consecutive trough lengths 1 are cut out to form coupling tongues 4 and 5 which interengage in the manner of straps or bands of a hinge. Corresponding tongues 4 and 5 overlap, alternately over the width of the trough. More particularly, each bottom plate 3 has on one abutment end an upper coupling tongue 4a at either side and a central lower coupling tongue 4b therebetween, and on its other abutment end, a lower coupling tongue 5a at either side and a central upper coupling tongue 5b. With the trough lengths 1 or bottom plates 3 assembled, the respective central upper coupling tongue 5b projects, with a predetermined play, between the two upper coupling tongues 4a of the adjoining through length 1, while the two lower coupling tongues 5a receive therebetween the central lower coupling tongue 4b of the adjoining trough length, again with a predetermined play. The provided play between coupling tongues 4 and 5 is such that, as before, the trough lengths 1 may move in vertical and horizontal planes into angles positions, as needed for negotiating depressions and saddles, and for the advancing operations. Upper coupling tongues 4a, and 5b have a tapering underside 6 and lower coupling tongues 4b and 5a have a tapering upper surface 7 of corresponding slope, and the cross sections of coupling tongues 4, and 5 are mutually identical. This results in identical lengths, and the widths of the tongues are identical too.

The abutting faces 8 of the side walls of the trough are provided with connecting bolts 9 on one side, and with corresponding recesses, such as blind bores on the other side, so that the connecting bolts, which are inserted in both the upper and lower corner portions of trough side walls 2 also perform a centering function, or at least assist the coupling tongues 4 and 5 in their centering function.

While specific embodiments of the invention have been shown and described in detail to illustrate the application of the principles of the invention, it will be understood that the invention may be embodied otherwise without departing from such principles.

What is claimed is:

1. A conveyor trough particularly for scraper chain conveyors, comprising a plurality of transversely extending interconnected plates with adjacent plates having engaging edges and with alternately arranged projecting tongues and recesses which, together define a hinged connection between longitudinally adjacent plates, each of said plates having one engaging edge with an underlying coupling tongue disposed at a low level at each side of an overlying coupling tongue disposed at a level over said underlying tongue, and an opposite edge with an overlying coupling tongue on each side of an underlying coupling tongue, said overlying tongues engaging over corresponding ones of said underlying tongues, said tongues being sized to leave a clearance therebetween both vertically and horizontally to permit some vertical and some horizontal angling between said plates, each of said plates being substantially flat and having top and bottom faces, each plate having at least one recess on its top face forming one of said underlying tongues and a recess on its bottom face forming one of said overlying tongues said recesses being offset from each other across the engaging edges of each plate, each overlying tongue having an underlying tapered face extending from an inner end face which is perpendicular to said bottom face, upwardly to an outer end face which is perpendicular to said top face and each underlying face having an upper tapered face which extends from an inner end face extending perpendicularly to said top face downwardly to an outer end face which is perpendicular to said bottom face.

2. A conveyor trough according to claim 1, wherein said clearance between said tongues includes a horizontal clearance between inner and outer end faces which is greater than a horizontal clearance between facing tapered faces of interconnected plates.

3. A conveyor trough according to claim 1, wherein each of said plates include upstanding side walls on each side thereof, said coupling tongues having identical cross sections.

4. A conveyor trough according to claim 3, wherein said upstanding side walls of said plates have flat abutting faces, at least one flat face having a connecting bolt extending outwardly therefrom and wherein a flat face of an adjacent plate has a recess into which said bolt extends.

* * * * *